United States Patent
Perello et al.

(10) Patent No.: US 9,499,690 B2
(45) Date of Patent: Nov. 22, 2016

(54) EIFS FORMULATIONS WITH ENHANCE RAIN RESISTANCE

(71) Applicants: Dow Global Technologies LLC, Midland, MI (US); Rohm and Haas Company, Philadelphia, PA (US)

(72) Inventors: Margarita Perello, Duebendorf (CH); Jeffrey J. Sobczak, Coatesville, PA (US); Mark D. Westmeyer, Collegeville, PA (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/563,055

(22) Filed: Dec. 8, 2014

(65) Prior Publication Data
US 2015/0159008 A1    Jun. 11, 2015

Related U.S. Application Data

(60) Provisional application No. 61/914,003, filed on Dec. 10, 2013.

(51) Int. Cl.
| | |
|---|---|
| C08L 33/02 | (2006.01) |
| C08L 33/12 | (2006.01) |
| C09D 133/12 | (2006.01) |
| B01J 2/04 | (2006.01) |
| C09D 133/02 | (2006.01) |
| C04B 26/06 | (2006.01) |
| C08J 3/12 | (2006.01) |
| C08K 3/00 | (2006.01) |
| C08K 3/36 | (2006.01) |
| C04B 103/00 | (2006.01) |
| C04B 111/00 | (2006.01) |
| C04B 111/10 | (2006.01) |

(52) U.S. Cl.
CPC *C08L 33/12* (2013.01); *B01J 2/04* (2013.01); *C04B 26/06* (2013.01); *C08J 3/122* (2013.01); *C08J 3/126* (2013.01); *C08L 33/02* (2013.01); *C09D 133/02* (2013.01); *C09D 133/12* (2013.01); *C04B 2103/0058* (2013.01); *C04B 2103/0065* (2013.01); *C04B 2111/00517* (2013.01); *C04B 2111/1037* (2013.01); *C08J 2333/12* (2013.01); *C08J 2429/04* (2013.01); *C08K 3/0033* (2013.01); *C08K 3/36* (2013.01); *C08L 2207/53* (2013.01); *C08L 2666/04* (2013.01); *C08L 2666/58* (2013.01); *C08L 2666/72* (2013.01); *C08L 2666/74* (2013.01)

(58) Field of Classification Search
CPC .... C08L 33/02; C08L 33/064; C08L 51/003; C08L 2207/53; C08L 2666/04; C08L 2666/58; C08L 2666/72; C08L 2666/74; C09D 133/064; C08K 3/0033; C08K 3/36
See application file for complete search history.

(56) References Cited

U.S. PATENT DOCUMENTS

| | | | |
|---|---|---|---|
| 3,894,980 | A | 7/1975 | DeTommaso |
| 4,916,171 | A | 4/1990 | Brown et al. |
| 5,403,894 | A | 4/1995 | Tsai et al. |
| 5,604,272 | A | 2/1997 | Penzel et al. |
| 5,705,553 | A | 1/1998 | Kuropka |
| 5,753,036 | A | 5/1998 | Hornaman et al. |
| RE36,042 | E | 1/1999 | Landy et al. |
| 5,908,877 | A | 6/1999 | Ci et al. |
| 6,630,533 | B2 * | 10/2003 | Konopka ........... C09D 5/34 427/133 |
| 6,765,072 | B1 | 7/2004 | Willimann et al. |
| 7,897,669 | B2 | 3/2011 | Foerg et al. |
| 8,497,315 | B2 | 7/2013 | Willimann et al. |
| 2008/0269390 | A1 | 10/2008 | Weitzel |
| 2013/0196070 | A1 * | 8/2013 | LeFevre ........... C04B 26/02 427/385.5 |
| 2015/0111995 | A1 * | 4/2015 | Kim-Habermehl . C04B 24/2641 524/5 |

FOREIGN PATENT DOCUMENTS

| | | |
|---|---|---|
| EP | 0013836 A1 | 8/1980 |
| WO | 2012007529 A2 | 1/2012 |
| WO | 2012024214 A1 | 2/2012 |
| WO | WO 2013134208 A1 * | 9/2013 ......... C04B 24/2641 |

* cited by examiner

*Primary Examiner* — Satya Sastri
(74) *Attorney, Agent, or Firm* — Andrew E. C. Merriam

(57) ABSTRACT

The present invention provides shelf-stable, non-cementitious dry mix compositions of inorganic non-cementious materials, such as sand, and water redispersible polymer powder (RDP) containing particles of a multi-stage acrylic copolymer having a calcium methacrylate salt group containing alkali-soluble resin outer stage and one or more inner stage, the particles further containing each of one or more nucleating agent having a boiling point of 150° C. to 500° C. and a water solubility of 3.5% or less, and one or more colloidal stabilizer, wherein the colloidal stabilizer and the multi-stage acrylic copolymer are contained in the same RDP particle.

7 Claims, No Drawings

EIFS FORMULATIONS WITH ENHANCE RAIN RESISTANCE

The present invention relates to non-cementitious compositions comprising water redispersible polymer powders (RDP), more particularly, acrylic RDPs, for use in exterior finishing compositions such as textured paints, e.g. topcoats in a multi-layered exterior wall system, and methods of making and using the same.

Multi-layered exterior wall systems such as exterior insulation and finish systems (EIFS) are used extensively as exterior wall surfaces in commercial and residential buildings. Such multi-layered systems are conventionally prepared by covering a substrate such as plywood or gypsum board with a layer of insulation material, covering the insulation material with a cementitious basecoat which is embedded with a reinforcing mesh and finishing with a non-cementitious topcoat or exterior finishing composition which is typically applied with a trowel to form a layer with a thickness of from 0.1 to 2.5 cm. Such exterior finishing compositions not only provide insulation but also act as a barrier to moisture ingress and provide a decorative function. However, for use in exterior applications, such topcoat or finishing compositions must be applied in cold or humid conditions. Specifically, formulators of the non-cementitious topcoat compositions for use in EIFS systems are in need of compositions that enable the contractors to apply the composition under adverse temperature (1-10° C.) and humidity (90-95% relative humidity) conditions without adversely impacting the applied coating.

Available liquid solutions involve the use of "quickset" technology represented by either of RHOPLEX™ EI-3500 polyamines and PRIMAL™ FS-3600 polyamines (The Dow Chemical Company, Midland, Mich.) blended with an acrylic emulsion copolymer. Both of these products afford early wash-out resistance. However, this technology requires the amine copolymer to be stabilized at a pH >10 to prevent rapid coagulation of the liquid dispersion, wherein volatile amines such as aqueous ammonia are used. This creates a substantial odor and potential safety concerns from the release of ammonia upon drying of the coating film. Both products have an ammonia odor in use.

The use of RDP compositions in external finishing compositions is disclosed, for example, in U.S. Pat. No. 5,908,877, which provides a RDP composition for use in water-resistant films and coatings. The disclosed RDP comprises a polymer containing carboxyl, hydroxyl, carboxylamide or amine functionality and a reactive component that forms a non-ionic bond with the polymer functional group following dispersion of the admixture in water. However, the coatings formed from such dry mix formulations provide reduced performance, specifically dirt pick up resistance and/or wet abrasion resistance, compared with textured paints prepared from liquid polymers specifically designed for use in exterior finishing compositions.

The present inventors have endeavoured to find an easily stored and transported dry composition or powder that offers equivalent performance to existing liquid topcoat compositions for use in exterior insulation and finish systems without the amine odor.

STATEMENT OF THE INVENTION

1. In accordance with the present invention, shelf-stable, non-cementitious dry mix compositions comprise i) one or more extenders, such as calcium carbonate, pigments, such as titanium dioxide, fillers, such as, silicon dioxide, sand or aggregate, or their mixtures, in a total % PVC of from 60-98%, or, preferably, from 70 to 98%, and ii) from 10-20 wt. %, based on the total weight of the composition solids, of water redispersible polymer powder (RDP) particles of a multi-stage acrylic copolymer having a calcium methacrylate salt group containing alkali-soluble resin outer stage and one or more inner stage, the particles further containing each of one or more nucleating agent having a boiling point of 150° C. to 500° C. and a water solubility of 3.5% or less, and one or more colloidal stabilizer, preferably, poly(vinyl alcohol) (PVOH), wherein when the multi-stage acrylic copolymer is dispersed in water the one or more inner stage comprises an acrylic (co)polymer having a glass transition temperature (Tg) of from −40 to 50° C., or preferably, −20 to 25° C., calculated using the Fox equation and wherein the weight ratio of the alkali-soluble resin outer stage to the one or more inner stage(s) range from 1:19 to 2:3, or, preferably, from 1:19 to 1:4, wherein the colloidal stabilizer and the multi-stage acrylic copolymer are contained in the same RDP particle.

2. The composition in accordance with 1, above, wherein the ii) water redispersible polymer powder contains from 0.1 to 20 wt. % of the one or more colloidal stabilizer, or, preferably, 0.5 to 15 wt. % per 100 weight parts multi-stage acrylic copolymer solids.

3. The composition in accordance with 1 or 2, above, wherein the composition comprises i) one or more fillers, extenders and pigments which are a) from 40 to 80 wt. % of silicon dioxide, aggregate, sand or their mixtures, b) from 0 to 10% of one or more extenders, c) 0-10% pigment, based on the total weight of composition solids.

4. In another aspect of the present invention, methods of making a water redispersible polymer powder comprise providing an aqueous dispersion containing one or more colloidal stabilizer, preferably, PVOH, and a multi-stage acrylic copolymer having an alkali-soluble resin outer stage comprising methacrylic acid groups and one or more inner stage, one or more nucleating agent having a boiling point of 150° C. to 500° C. and a water solubility of 3.5% or less, wherein when the multi-stage acrylic copolymer is dispersed in water the one or more inner stage comprises an acrylic (co)polymer having a glass transition temperature (Tg) of from −40 to 50° C., or preferably, −20 to +25° C., calculated using the Fox equation, and atomizing the aqueous dispersion, such as, for example, by spray drying, in the presence of calcium hydroxide or aqueous lime in an amount so as to provide a mole ratio of calcium cation ($Ca^{2+}$) to moles of methacrylic acid of 0.347:1 to 1.3:1, or, preferably, from 0.94:1 to 1.06:1. For the purposes of the present invention, the number of moles of calcium cation is assumed to be equal to the number moles of either lime or calcium hydroxide, or their combination, whichever is used.

5. According to a third aspect, the present invention provides non-cementitious exterior finishing compositions comprising the composition of any of 1, 2, or 3, above, and water.

6. According to a fourth aspect, the present invention provides methods of using the compositions of 5, above, comprising applying the compositions to a substrate and drying or allowing them to dry.

Throughout the specification, any reference to percent or percent weight etc. is expressed in terms of dry weight of the composition unless otherwise specified. Further, all ranges recited in the specification are inclusive and combinable.

Unless otherwise indicated, all temperature and pressure units are room temperature and standard pressure.

All phrases comprising parentheses denote either or both of the included parenthetical matter and its absence. For example, the phrase "(meth)acrylate" includes, in the alternative, acrylate and methacrylate.

As used herein the term "acrylic" refers to polymers that comprise the polymerization product of monomer mixtures containing more than 50 wt. %, based on total monomer solids, of any acrylic monomers such as, for example, acrylates, methacrylates, (meth)acrylamides, and (meth) acrylic acids.

As used herein, unless otherwise indicated, the phrase "average particle size", of a water redispersible polymer powder particle refers to the particle diameter or the largest dimension of a particle in a distribution of powder particles as determined by laser light scattering such that 50 wt. % of the particles in the distribution are smaller than the particle and 50 wt. % of the particles in the distribution are larger than the particle. For redispersed particles, the particle size distribution was measured using a Coulter™ LS 230 particle size analyzer (Beckman Coulter, Brea, Calif.) per manufacturer's recommended Procedures via laser scattering. The scattering light from particles through laser scattering and polarization intensity differential scattering is collected as a function of angle, and subsequently converted to a particle size distribution.

As used herein, unless otherwise indicated, the term "average particle size" for latex or emulsion particles refers to a weight average particle size measured via dynamic light scattering using a Brookhaven Instruments Corporation 90PLUS™ Particle Size Analyzer (Holtsville, N.Y.) per manufacturer's recommendations.

"Glass transition temperature" or "$T_g$" is the glass transition temperature of a copolymer calculated using the Fox equation [Bulletin of the American Physical Society 1, 3 Page 123 (1956)] as follows:

$$1/T_g = w_1/T_{g(1)} + w_2/T_{g(2)}$$

For a copolymer, $w_1$ and $w_2$ refer to the weight fraction of the two monomers, based on the weight of monomers charged in the reaction vessel, and $T_{g(1)}$ and $T_{g(2)}$ refer to the glass transition temperatures of the two corresponding homopolymers in degrees Kelvin. For polymers containing three or more monomers, additional terms ($w_n/T_{g(n)}$) are added. The glass transition temperatures of the homopolymers for suitable monomers useful in the present invention are reported in "Polymer Handbook", edited by J. Brandrup and E. H. Immergut, Interscience Publishers, 1966.

As used herein, the term "measured $T_g$" refers to that value measured by differential scanning colorimetry (DSC), wherein the polymer is prepared and maintained in the absence of ammonia or primary amine, and is then dried, preheated to 120° C., rapidly cooled to −100° C., and then heated to 150° C., at a rate of 20° C./minute while data is collected. The glass transition temperature for the polymer is measured at the midpoint of the inflection using the half-height method.

As used herein, unless otherwise indicated, the phrase "molecular weight" refers to the weight average molecular weight as measured by gel permeation chromatography (GPC) against a set of poly(styrene) standards of a size sufficiently small (i.e. low enough MW) to resolve the molecular weight of the analyte.

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer. Thus, the term "polymer" includes copolymers and polymers within its scope.

As used herein, the term "% PVC" means the amount given by the equation:

$$PVC(\%) = V_{pigment}/(V_{pigment} + V_{binder}) \times 100,$$

wherein $V_{pigment}$ represents the volume of pigment within the composition, and $V_{binder}$ represents the volume of polymeric binder within the composition.

As used herein, the terms "water redispersible polymer powder", "redispersible polymer powder" and "RDP" are used interchangeably and refer to a polymer-containing powder which may readily be dispersed into deionized water to provide a particle size distribution of the original particle size of the latex or emulsion polymer used to make the powder.

As used herein, the term "substantially free of surfactants" means a composition that contains less than 5000 ppm of surfactant, based on the total weight solids of the composition, or, preferably, less than 2500 ppm.

As used herein, the term "water solubility" refers to the amount of a given material that visibly dissolves in water at room temperature, expressed as a percentage of the total weight or mass of water used. So, for example, if 5 grams of a material would dissolve in 100 g of water, the water solubility of that material is 5%.

The term "non-cementitious" refers to compositions which are substantially free of calcium silicate containing materials which react with water and harden to produce a water insoluble material.

As used herein, the term "substantially cement free" means less than 5 wt. %, preferably less than 2 wt. %, and more preferably less than 1 wt. %, based on the total weight of the exterior finishing composition.

As used herein, unless otherwise specified, the phrase "wt. %" stands for weight percent and is expressed in terms of dry weight or solids. The term "solids" excludes volatiles and water.

The key attribute of the composition of the present invention is its early wash-out resistance in the event of an early rain before the formulation is fully cured. The present inventors have surprisingly discovered that a multi-stage acrylic copolymer water redispersible polymer powder having a methacrylic acid group containing alkali soluble resin outer stage can enable such early wash out resistance if it is dried in the presence of a certain amount calcium hydroxide or lime to make the powder. The calcium methacrylate salt group containing multi-stage acrylic copolymer RDPs are free flowing and storage stable and provide enhanced performance when used in making non-cementitious topcoats for exterior insulation and finish systems.

The RDP of the present invention comprises a colloidal stabilizer. Preferably, the RDP comprises a colloidal stabilizer. The colloidal stabilizer can be present in an amount from 0.1 to 30 wt. %, or, preferably, up to 20 wt. %, or, more preferably in an amount from 2.0 to 10.0 wt. %, based on the total dry weight of the RDP.

Preferably, to avoid the use of excess surfactant, at least a portion of the total amount of colloidal stabilizer within the RDP is present during polymerization of the carboxyl group-containing multi-stage acrylic copolymer. Preferably, the total amount of colloidal stabilizers included within the RDP is added during polymerization of the carboxyl group-containing multi-stage acrylic copolymer. Preferably, the RDP comprises a colloidal stabilizer in an amount from 0.05 to 15 wt. %, based on the total weight of monomer solids.

More preferably, the colloidal stabilizer is added in an amount from 0.1 to 10 wt. %, even more preferably from 2.0 to 4.0 wt. %. Anionic and non-ionic surfactants may also be used in polymerization in amounts of less than 0.5 wt. % of the total water redispersible polymer powder solids.

Preferably, the colloidal stabilizer used in the present invention is selected from: polyvinyl alcohols (PVOH) of various known molecular weights and degrees of hydrolysis, e.g. partially hydrolysed polyvinyl alcohols; chelating agents, such as, for example, ethylenediamine tetraacetate; polyacrylamides; polyvinylpyrrolidones; polysaccharides; polyvinyl sulfonic acid, cellulose; cellulose ethers; polyesters; and mixtures thereof. Most preferably the colloidal stabilizer is PVOH.

The RDP of the present invention comprises a nucleating agent. Suitable nucleating agents include any compound having a boiling point of at least 150° C., preferably at least 200° C., and a maximum of 500° C., preferably a maximum of 400° C., and a water solubility of 3.5% or less, preferably 1.0% or less, more preferably 0.5% or less. However, to ensure that the nucleating agent is within the RDP, the nucleating agent should not be volatile under the RDP processing conditions. Preferably, the total amount of nucleating agent within the RDP is present during polymerization of the carboxyl group-containing multi-stage acrylic copolymer. Preferably, the acrylic copolymer comprises from 0.1 to 4.0 wt. %, more preferably from 0.5 to 3.0 wt. %, still more preferably from 1.0 to 2.0 wt. % of the nucleating agent(s). These nucleating agents are preferably included during the first stage of copolymerisation of the multi-stage carboxyl-group containing acrylic polymer or prior to or during polymerising to form the alkali soluble resin stage.

Preferably to improve redispersibility, nucleating agents are used instead of surfactants during copolymerisation.

Suitable nucleating agents are selected from $C_3$ to $C_{10}$ alkyl glycol ethers; phenyl glycol ethers, such as ethylene glycol phenyl ether; $C_3$ to $C_{10}$ alkyl diglycol ethers, such as dipropylene glycol n-butyl ether; $C_3$ to $C_{10}$ alkylaryl glycol ethers, such as ethylene glycol octylphenyl ether; $C_3$ to $C_{10}$ alkylaryl diglycol ethers, such as dipropylene glycol butylphenyl ether; $C_3$ to $C_{10}$ alkyl esters of $C_3$ to $C_9$ alkanoic acids, such as alkyl isobutyrates and branched alkyl isobutyrates, like 2,2,4-trimethyl-1,3-pentanediol monoisobutyrate; $C_3$ to $C_{10}$ alkyl esters of $C_3$ to $C_9$ alkanedioic acids, such as butyl succinate; $C_3$ to $C_{10}$ alkyl diesters of $C_3$ to $C_9$ alkanoic acids, such as 2,2-dimethyl-1-methylethyl-1,3-propanediylbis-2-methyl propionate; and $C_3$ to $C_{10}$ dialkyl esters of $C_3$ to $C_9$ alkanedioic acids, such as diisobutyl glutarate, diisobutyl succinate, diisobutyl adipate; and mixtures thereof. Preferably, the nucleating agent is selected from linear or branched alkyl isobutyrates. Examples of suitable nucleating agents are shown in Table 1, below.

Preferably, the multi-stage acrylic copolymer comprises, in polymerized form, from 0.1 to 20 wt. %, based on the total weight of monomers used to make the copolymer, of methacrylic acid or methacrylic acid with up to 5 wt. %, based on the total weight of monomers used to make the copolymer, of another carboxyl group containing monomer. More preferably, the copolymer comprises, in copolymerized form, from 0.5 to 5.0 wt. %, still more preferably, from 1.0 to 3.5 wt. % of methacrylic acid, based on the total weight of monomers used to make the copolymer.

Suitable carboxyl containing monomers include acrylic acid, methacrylic acid, itaconic acid, maleic acid, fumaric acid, acrylic anhydride, methacrylic anhydride, half esters of maleic anhydride/fumaric/itaconic, maleic anhydride, and itaconic anhydride. Preferably, the carboxyl containing monomer is (meth)acrylic acid.

TABLE 1

| Nucleating Agent | BP (° C.) | $H_2O$ Solubility |
|---|---|---|
| 2,2-dimethyl-1-methylethyl-1,3-propanediyl bis-2-methyl propionate | 344 | Negligible |
| diisobutyl glutarate (55-65%); diisobutyl succinate (15-25%); diisobutyl adipate (10-25%) | 274-289 | Negligible |
| ethylene glycol phenyl ether (DALPAD™[1] A) | 244 | 2.5% |
| ethylene glycol phenyl ether (DOWANOL™[1] EPh) | 244 | 3.1% |
| 2,2,4-trimethyl-1,3-pentanediol monoisobutyrate | 254 | 0.1% |
| propylene glycol phenyl ether | 243 | 2.0% |
| dipropylene glycol n-butyl ether | 230 | 4.5% |
| ethylene glycol octylphenyl ether | 250 | Negligible |

[1] Dow Chemical Co., Midland, MI

The multi-stage acrylic copolymer comprises an alkali-soluble resin outer stage and one or more inner stage(s). When dispersed in water, the inner stage comprises an acrylic (co)polymer having a glass transition temperature (Tg), calculated using the Fox equation, of from −40 to 50° C., preferably from −30 to 35° C., more preferably from −20 to 25° C., and, still more preferably from −10 to 20° C.

The relative proportion, expressed in terms of a weight ratio, of the alkali-soluble resin outer stage to the one or more inner stage(s) is from 1:19 to 2:3. Preferably, the weight ratio of the alkali-soluble resin outer stage to the one or more inner stage(s) is from 1:19 to 1:4, still more preferably from 1:19 to 3:17.

The multi-stage acrylic copolymer forms a core/shell structure in water with the alkali-soluble resin stage located on the outside of the polymer particle, either as a result of grafting or physiadsoprtion. Thus, the carboxyl groups in the copolymer are located at the surface of the redispersible copolymer powder particles. The inclusion of a nucleating agent helps to ensure coverage of the inner stage(s) of the multi-stage acrylic copolymer particle with the alkali soluble resin and, thus, improves the colloidal stabilization of the core. In addition, reducing or eliminating the surfactant requirement from the multi-stage copolymer production enables a relatively larger particle size alkali soluble resin which helps to colloidally stabilize the inner stage(s) of the acrylic copolymer in the RDP.

The multi-stage acrylic copolymers are produced using conventional emulsion copolymerisation techniques, such as is described in U.S. Pat. No. 5,403,894, except that copolymerization to from the alkali soluble resin takes place in the presence of a nucleating agent and, preferably, in a polymerization mixture that is substantially free of surfactants. Conventional thermal polymerization initiators such as persulfate salts, and/or redox initiators, such as peroxides with bisulfite salts may be used.

In general, two copolymerization techniques may be used; and all but one polymerization stage comprises a polyfunctional monomer to graft together the polymer stages. Technique one comprises emulsion polymerizing a monomer mixture of an ethylenically unsaturated carboxylic acid or anhydride and one or more non-ionic monomer, such as an alkyl (meth)acrylate, styrene, alkyl substituted styrene, (meth)acrylamide, or hydroxyalkyl (meth)acrylate, in the presence of a polyfunctional monomer to form an alkali soluble resin, neutralizing the alkali soluble resin with an amine base and, in a second stage, forming a monomer mixture of one or more non-ionic monomer, combining the second-stage monomers with the alkali soluble resin and polymerizing the monomer mixture to form the copolymers of the present invention. In one variation of this technique, the polyfunctional monomer is part of the second stage monomer mixture, not the monomer mixture that forms the alkali soluble resin, and is polymerized in the presence of the neutralized alkali soluble resin to form the inner stage polymer.

A second polymerization technique, as described in U.S. Pat. No. 4,916,171, comprises emulsion polymerizing a monomer mixture of one or more non-ionic monomer in the presence of a polyfunctional monomer to form an inner stage polymer and, in a subsequent stage, forming a monomer mixture of an ethylenically unsaturated carboxylic acid or anhydride and one or more nonionic monomer and combining the monomer mixture with the inner stage and polymerizing the mixture to form the copolymer. So long as there is one alkali soluble resin stage, additional nonionic monomer stages may be copolymerized along with the addition of a polyfunctional monomer to make multi-stage copolymers. In polymerization, the temperature in each stage may range from 20 to 105° C., or, preferably from 50 to 95° C.

The resulting weight ratio of the total solids of the one or more inner stage copolymers to the alkali soluble resin polymer may range from 19:1 to 3:2, or, preferably 19:1 to 1:4, or, more preferably, from 19:1 to 3:17. In any polymerization, the initial stage may be formed by seed polymerization according to conventional methods.

Suitable non-ionic monomers for the preparation of the multi-stage acrylic copolymers may be chosen from ethyl acrylate, butyl acrylate, 2-ethylhexyl acrylate, methyl methacrylate, ethyl methacrylate, butyl methacrylate, methylolated (meth)acrylamide and methyl methacrylamide, hydroxyethyl (meth)acrylate. Nonionic monomers should comprise 5 wt. % or less of any hydroxyalkyl or methylolated monomer or amide group containing monomer. The selection of nonionic monomers that give a polymer stage having a desired Tg is conventional in the art.

Suitable polyfunctional monomers may be from (a) multi-ethylenic monomers having two or more sites of unsaturation, such as, for example, allyl-, methallyl-, vinyl-, dicyclopentenyl and crotyl-esters of acrylic, and methacrylic acids, divinyl benzene, (poly)glycol di(meth)acrylates, such as, diethyleneglycol dimethacrylate; and polyol poly(meth) acrylates, such as trimethylolpropane trimethacrylate; (b) reactive chain transfer agents having two or more abstractable atoms, such as, for example, bromotrichloromethane; bromoform; carbon tetrachloride; and carbon tetrabromide; and (c) hybrid polyfunctional monomers having one or more sites of unsaturation and one or more abstractable atoms, such as, for example, allyl-, methallyl-, and crotyl-mercaptan; vinyl ethers and vinyl thioethers of cycloalkenols and cycloalkene thiols. Preferred polyfunctional monomers include allyl or methallyl (meth)acrylate, N-methallyl vinyl-amides of acrylic acid and methacrylic acid; and allyl-mercaptan. Useful amounts of polyfunctional monomers range from 0.01 to 5 wt. %, based on the total weight of monomers in the monomer mixture in which they are used, or, preferably, from 0.25 to 3.0 wt. %.

The RDP of the present invention may comprise other polymers blended with the carboxyl-group containing multi-stage acrylic copolymer as long as the amount, in copolymerized form, of methacrylic acid, based on the total weight of the total polymer solids, remains from 0.1 to 20 wt. %. Such other polymers may be, for example, any nonionic (co)polymer, such as a polyolefin, olefin-vinyl ester, for example, ethylene-vinyl acetate, alkyl (meth)acrylates, styrene, or styrene acrylic copolymers. The blends may comprise from 20 to 80 wt. %, or, preferably, from 30 to 70 wt. % or, more preferably, from 40 to 60 wt. % of such nonionic (co)polymers, based on total polymer solids in the RDP.

The RDP of the present invention may comprise polymers that are the addition copolymerisation product of from 0.001 to 5 wt. %, or, preferably, 0.1 to 1.0 wt. %, based on the total weight of monomers used to make the copolymer, of a silyl group containing monomer, such as γ-methacryloyloxypropyl trimethoxy silane or vinyl trialkoxy silanes or a benzophenone containing monomer, such as vinyl benzophenone.

Preferably, the RDP further comprises an anti-caking agent. If present, the total amount of anti-caking agent included in the RDP is from 3.0 to 30.0 wt. %, preferably from 8.0 to 15.0 wt. %, on the total dry weight of the RDP. Preferably, the anti-caking agent is selected from kaolin clay, alumina silicate, dolomite, calcium carbonate, dolomite, silicate minerals and blends thereof. More preferably, the anti-caking agent is selected from kaolin clay, alumina silicate and combinations thereof. Preferred alumina silicates are MINEX™ Industrial Grade Nos. 16 to 60, i.e. compositions comprising silicon dioxide, aluminium oxide, iron oxide and sodium oxide, calcium oxide, magnesium oxide and sodium oxide having a mesh particle size of less than 1.18 mm (#16), preferably less than 150 μm (#60).

In addition, the multi-stage acrylic copolymer RDP may comprise other conventional additives such as, for example, antifoaming agents, typically present in an amount of up to 1.5 wt. %, based on total solids. Other additives that may be employed, in conventional amounts, include one or more salts, such as $CaCl_2$, $MgCl_2$, monosaccharides, disaccharides, dispersants or superplasticizers.

The average particle size of the RDP of the present invention may range from 50 to 500 nm, preferably from 100 to 400 nm, or more preferably from 163 to 350 nm.

Preferably, the total amount of the multi-stage acrylic copolymer and nucleating agent present in the RDP is from 40 to 99.9 wt. %, based on the total dry weight of the RDP. More preferably, the total amount of the multi-stage acrylic copolymer and nucleating is from 50 to 96.9 wt. %, based on the total dry weight of the RDP.

The RDP of the present invention may be formed by atomizing to dry an aqueous dispersion mixture comprising the carboxyl group containing multi-stage acrylic copolymer, aqueous lime or calcium hydroxide, and, if required, additional colloidal stabilizer and/or any optional components e.g. an anti-caking agent. Preferably, drying the aqueous mixture comprises spray drying. Spray drying can be carried out in customary spray drying plants, with atomization being carried out by means of single-fluid, two-fluid or multifluid nozzles or a rotary disc atomizer. In general, air, nitrogen or nitrogen enriched air may be employed as the drying gas, the inlet temperature of the drying gas generally not exceeding 200° C., preferably from 110° C. to 180° C., more preferably from 130° C. to 170° C. The outlet temperature may generally be from 45° C. to 120° C., preferably from 60° C. to 90° C., depending on the plant, the Tg of the resin and the desired degree of drying. In one example, the viscosity of the feed to be spray-dried may be adjusted via the solids content so that a value of less than 1000 mPas (Brookfield viscosity at 20 rpm and 23° C.), preferably less than 250 mPas, is obtained. The solids content of the admixture to be spray-dried may generally be from 25% to 60% by weight, preferably from 35% to 50% by weight, based on the total weight of the dispersion.

The amount of calcium hydroxide or lime used in the methods of making the RDP of the present invention may be expressed by a calcium hydroxide or lime:methacrylic acid weight ratio of 0.31:1 to 1.200:1, wherein the weight of the methacrylic acid is the amount of the methacrylic acid used to make the multi-stage acrylic copolymer and the weight of lime or calcium hydroxide is a dry weight.

RDPs of the present invention have a variety of uses. The RDPs may be used as functional additives in a wide range variety of compositions such as in non-cementitious exterior finishing compositions such as, for example, a textured and, optionally, pigmented topcoat formulation for use in an exterior insulation and finish system (EIFS).

As used herein, "aggregate" refers to any material that imparts surface texture to a dried layer of the resulting exterior finishing composition, preferably, a sand, or, more preferably, a silicon dioxide containing sand. Preferably, the aggregate is present in an amount of from 50 to 70 wt. %, based on dry weight of the formulation.

The dry mix compositions or formulations of the present invention remains shelf stable so long as dry. Once wetted or moist, it must be used immediately or it will block or cure and become unusable in later application.

Preferably, the dry mix compositions or formulations further include a pigment. The pigment may be an inorganic pigment, e.g. a titanium, aluminium, cobalt, copper, iron, chromium, lead, manganese, titanium or tin pigment, or the pigment may be an organic pigment, e.g. carbon black. Preferably, the pigment is an inorganic pigment, more preferably a titanium pigment and most preferably titanium dioxide ($TiO_2$). When present, the dry mix formulation preferably comprises such pigment(s) in an amount no more than 10 wt. %, preferably from 1 to 10 wt. %, based on the total weight of the dry mix formulation.

Optionally, the dry mix formulations of the present invention further comprises one or more filler or extender particles. Such filler or extender particles are included to provide opacity to the finishing composition. If present, the filler or extender particles are preferably included in an amount of from 2 to 30 wt. %, more preferably from 4 to 25 wt. %, even more preferably from 10 to 15 wt. %, based on the dry weight of the formulation. Preferred filler or extender products are selected from clay, calcium carbonate, silicates, particularly alumina silicates, talcs, dolomite, silicate minerals, and combinations thereof. Most preferably, the filler or extender particles are selected from calcium carbonate, silicates and combinations thereof.

Preferably, the dry mix formulation or composition having inorganic ingredients has a total pigment volume concentration (PVC) content of from 68 to 99.9%.

The dry mix formulations of the present invention may, in addition to the components identified above, comprise one or more conventional additives such as, for example, rheology modifiers, thickeners, defoamers, adhesion promoters, UV stabilizers, like benzophenone, preservatives, biocides, mildewcides and/or anti-freeze agents, all of which are well known in the art.

Preferably, the dry mix compositions for use in exterior finishing further comprise an additional, i.e. non-RDP derived, colloidal stabilizer. In such embodiments, the colloidal stabilizer is preferably present in an amount, based on total polymer solids, of no more than 20 wt. %, more preferably no more than 5 wt. %. Suitable and preferred colloidal stabilizers are as indicated, above.

Preferably, the dry mix formulations for exterior finishing further comprise a hydrophobic agent. More preferably, the hydrophobic agent is selected from ester or sulfonate compounds comprising a linear or branched alkyl group comprising at least 8, more preferably at least 12 carbon atoms, an aryl or an arylakyl group or salts, preferably sodium, zinc, calcium, potassium or ammonium salts, thereof. Still more preferably the hydrophobic agent is selected from sodium lauryl sulfate (SLS), sodium oleate, sodium stearate, sodium dodecylbenzenesulfonate or a zinc, calcium, potassium or ammonium salt thereof. Still more preferably, the hydrophobic compound is SLS. In such embodiments, the hydrophobic agent is preferably present in an amount, based on total polymer solids, of from 0.1 to 10 wt. %, more preferably from 0.5 to 7.5 wt. %, based on the total dry weight of the composition. This can be added before, during or after atomization to make the RDP.

According to a further aspect, the present invention provides a non-cementitious exterior finishing composition comprising the dry mix formulations of the present invention and water. An exterior finishing composition comprises from 10 to 30 wt. %, based on the total weight of the exterior finishing composition, of water mixed with the dry mix composition of the present invention. Preferably, the exterior finishing composition is a topcoat in an exterior insulation and finish system (EIFS).

According to a further aspect, the present invention provides a method of coating a substrate with an exterior finishing composition, the method comprising applying the composition to a the substrate and drying or allowing to dry the exterior finishing composition.

Suitable substrates may include, but are not limited to, cementitious and non-cementitious substrates such as concrete, brick, stucco, masonry, EIFS, plywood, oriented strand board, gypsum, fiber-cement, and metal.

The present invention is below further described by way of Examples. All ratios, parts and percentages are expressed by dry weight unless otherwise specified, and all components are of good commercial quality unless otherwise specified.

EXAMPLES

As shown below in Table 2, the following materials were used to prepare the multi-stage acrylic copolymers in the Examples:

TABLE 2

| Name | Composition |
|---|---|
| MOWIOL ™, [2] 4-88 Solution | polyvinyl alcohol (86.7 to 88.7% hydrolysed, $M_W$ ~31K (20 wt. %) |
| PLURONIC ™, [4] L-31 | ethylene oxide-propylene oxide-ethylene oxide block copolymer |
| TEXANOL ™, [3] | 2,2,4-trimethyl-1,3-pentanediol monoisobutyrate |
| TRITON ™, [1] X-15 | ethylene glycol octylphenyl ether; HLB = 1.5 |
| VERSENE ™, [1] | EDTA, tetrasodium salt |
| WINNOFIL ™, [5] S | $CaCO_3$ coated with stearic acid |
| DEQUEST ™ 2016[6] | 1-Hydroxyethylene-1,1,-diphosphonic acid sodium salt (Na4HEDP) |

[1] Dow Chemical Co., Midland, MI;
[2] Kuraray America, Inc., Houston, TX;
[3] Eastman Chemical, Kingsport, TN;
[4] BASF Ag Florham Park, NJ;
[5] Solvay Advanced Functional Materials, Houston, TX;
[6] Italmatch Chemicals Redbank, NJ.

Emulsions A and B were each made by an inverse two-stage process in which alkali soluble resin was prepared prior to polymerization of the inner stage copolymer in the presence of the alkali soluble resin.

TABLE 1-1

| Monomer Emulsion #1 (ME1) | Wt (gm) |
|---|---|
| DI water | 1106 |
| Dequest 2016 | 0.137 |
| sodium dodecylbenzenesulfonate (NaDBS) | 3.44 |
| Texanol | 90.7 |
| methyl methacrylate (MMA) | 711.0 |
| allyl methacrylate (ALMA) | 13.82 |
| glacial methacrylic acid (MAA) | 181.2 |
| methyl 3-mercapto propionate (MMP) | 31.64 |

| Solutions | | | | | |
|---|---|---|---|---|---|
| Activator | Wt (gm) | Initiator | Wt (gm) | Promoter | Wt (gm) |
| SSF | 11.50 | tBHP | 17.86 | FeSO$_4$—7 H$_2$O | 0.106 |
| DI Water | 116 | DI Water | 91 | EDTA, Tetrasodium Salt | 0.132 |
| | | | | DI Water | 23 |

| Chase Activator | | | |
|---|---|---|---|
| SSF | 2.01 | tBHP | 2.87 |
| DI Water | 45 | DI Water | 110 |

| Neutralizer (Stage 1) | Wt (gm) |
|---|---|
| DI Water | 470 |
| sodium hydroxide (50 wt. % water) | 109.4 |
| calcium hydroxide | 51.9 |

Synthesis of Emulsion A:

To a 50 L reactor equipped with a mechanical stirrer, thermocouple, condenser and a stainless steel feed ports was charged with 2176 g of deionized (DI) water at ambient temperature (18° C.). A monomer emulsion #1 (ME1) as shown in Table 1-1, above, was transferred with a FMI (Fluid Meter Incorporated, Syosset, N.Y.) pump at its maximum rate into the reactor over ~15 minutes. An additional 104 g DI water rinse was then added to the reactor. With the reactor temperature at 18° C., three separate aqueous solutions of sodium sulfoxylate formaldehyde (SSF), tert-butylhydroperoxide (tBHP) and ferrous sulfate heptahydrate, as shown in Table 1-1, above, were added sequentially to the reactor. An exothermic reaction was observed within 2-3 minutes, gradually increasing to 54° C. over 18 minutes. After the temperature peaked, two aqueous chaser solutions composed of tBHP and SSF were added to the reactor to reduce residual monomer. After 10 minutes, an aliquot was taken and analyzed for 289 nm (BI90 plus), 77 ppm MMA, and pH 2.09. The resulting latex was next treated with a neutralizer solution composed of aqueous solution of sodium hydroxide and calcium hydroxide to afford slightly soluble copolymer with a semi-transparent solution (pH=11).

After 15 minutes and the reactor temperature at 50° C., 1098 g of monomer emulsion (ME2), as shown in Table 1-2, below, was added to the reactor followed by the addition of an aqueous ammonium persulfate (APS) initiator solution and an aqueous sodium metabisulfite solution (NaMBS). An exothermic reaction was observed within 2 minutes, gradually increasing to 65° C. in 10 minutes. After the temperature peaked, the gradual addition of ME2, an aqueous ammonium persulfate solution (cofeed initiator solution) and a sodium metabisulfite (NaMBS) solution (cofeed activator solution) were added at 60.38, 3.36 and 4.07 g/min, respectively. After 10 minutes, these feeds were increased to 90.57, 5.04 and 6.11 g/min, respectively. After an additional 10 minutes, these feeds were increased to 120.76, 6.71 and 8.15 g/min, respectively. After 8781 g of ME2 had been fed to the reactor, 38.41 gm of ALMA was added to ME2 followed by 45 g DI Water. Total feed time was 90 minutes and the reaction temperature was maintained between 65-67° C. After these feeds were completed, 415 g of DI Water was used to rinse the ME2 to the reactor and 45 g of DI Water was used to rinse each of the cofeed solutions to the reactor. After these rinses had been fed to the reactor, aqueous solutions of tBHP and SSF were feed to the latex over 20 minutes while cooling the latex to 50° C. At 50° C., a biocide (Kordek LX5000, Dow Chemical, Midland, Mich.) was added to the latex and the latex was isolated and analyzed: 47.28% Solids; pH 6.90: 262 nm average particle size (BI90 plus), a viscosity of 289 cPs (LV #2/60 rpms), 11 ppm MMA and 227 ppm BA.

TABLE 1-2

| ME2 | Wt (gm) | Initiator | Wt (gm) | Cofeed Initiator Solution | Wt (gm) |
|---|---|---|---|---|---|
| DI water | 2151.5 | APS | 13.59 | APS | 21.23 |
| Dequest 2016 | 1.16 | DI WATER | 114 | tBHP | 0.68 |
| Mowiol ™ 4-88 solution (20% wt) | 1075.4 | | | DI water | 566 |
| sodium lauryl sulfate (SLS) | 55.5 | | | | |

| | | Activator | | Cofeed Activator Solution | |
|---|---|---|---|---|---|
| butyl acrylate (BA) | 4640.1 | | | | |
| MMA | 3046.8 | NaMBS | 9.78 | NaMBS | 32.11 |
| MMP | 5.79 | DI Water | 114 | DI Water | 681 |

Synthesis of Emulsion B:

TABLE 2-1

| Monomer Emulsion #1 (ME1) | Wt (gm) |
|---|---|
| DI water | 1261 |
| Dequest 2016 | 0.165 |
| sodium dodecylbenzenesulfonate (NaDBS) | 4.13 |
| Texanol | 108.9 |
| methyl methacrylate (MMA) | 853.8 |
| allyl methacrylate (ALMA) | 16.59 |
| glacial methacrylic acid (MAA) | 217.6 |
| methyl 3-mercapto propionate (MMP) | 37.99 |

| Solutions | | | | | |
|---|---|---|---|---|---|
| Activator | Wt (gm) | Initiator | Wt (gm) | Promoter | Wt (gm) |
| SSF | 11.05 | tBHP | 17.15 | FeSO$_4$—7 H$_2$O | 0.102 |
| DI Water | 133 | DI Water | 86 | EDTA, Tetrasodium Salt | 0.127 |
| | | | | DI Water | 43 |

| Chase Activator | | | |
|---|---|---|---|
| SSF | 1.93 | tBHP | 2.75 |
| DI Water | 108 | DI Water | 65 |

| Neutralizer (Stage 1) | Wt (gm) |
|---|---|
| DI Water | 522 |
| sodium hydroxide (50 wt. % water) | 131.4 |
| calcium hydroxide | 62.3 |

This emulsion was prepared in accordance with the procedure described in Example A, except the weight ratio of ME1 and ME2 was changed from 10:90 to 12.5:87.5. To a 50 L reactor equipped with a mechanical stirrer, thermocouple, condenser and a stainless steel feed ports was charged with 1957 g of deionized (DI) water at ambient temperature (18° C.). A monomer emulsion #1 (ME1) as shown in Table 1-1, above, was transferred with a FMI (Fluid Meter Incorporated, Syosset, N.Y.) pump at its maximum rate into the reactor over ~15 minutes. An additional 217 g DI water rinse was then added to the reactor. With the reactor temperature at 23.9° C., three separate aqueous solutions of sodium sulfoxylate formaldehyde (SSF), tert-butylhydroperoxide (tBHP) and ferrous sulfate heptahydrate, as shown in Table 2-1, below, were added sequentially to the reactor. An exothermic reaction was observed within 2-3 minutes, gradually increasing to 58.6° C. over 23 minutes. After the temperature peaked, two aqueous chaser solutions composed of tBHP and SSF were added to the reactor to reduce residual monomer. After 10 minutes, an aliquot was taken and analyzed for 304 nm (BI90 plus), 123 ppm MMA, and pH 2.37. The resulting latex was next treated with a neutralizer solution composed of aqueous solution of sodium hydroxide and calcium hydroxide to afford slightly soluble copolymer with a semi-transparent solution and a pH 11.

After 15 minutes and the reactor temperature at 63.8° C., 1054 g of monomer emulsion (ME2), as shown in Table 1-2, below, was added to the reactor followed by the addition of an aqueous ammonium persulfate (APS) initiator solution and an aqueous sodium metabisulfite solution (NaMBS). An exothermic reaction was observed within 2 minutes, gradually increasing to 75.4° C. in 6 minutes. After the temperature peaked, the gradual addition of ME2, an aqueous ammonium persulfate solution (cofeed initiator solution) and a sodium metabisulfite (NaMBS) solution (cofeed activator solution) were added at 58.4, 3.10 and 3.91 g/min, respectively. After 10 minutes, these feeds were increased to 87.6, 4.65 and 5.87 g/min, respectively. After an additional 10 minutes, these feeds were increased to 116.76, 6.21 and 7.83 g/min, respectively. After 8433 g of ME2 had been fed to the reactor, 36.89 gm of ALMA was added to ME2 followed by 109 g DI Water. Total feed time was 90 minutes and the reaction temperature was maintained between 71-73° C. After these feeds were completed, 434 g of DI Water was used to rinse the ME2 to the reactor and 44 g of DI Water was used to rinse each of the cofeed solutions to the reactor. After these rinses had been fed to the reactor, aqueous solutions of tBHP and SSF were feed to the latex over 20 minutes while cooling the latex to 50° C. At 50° C., a biocide (KORDEK™ LX5000, Dow Chemical, Midland, Mich.) was added to the latex and the latex was isolated and analyzed: 47.24% Solids; pH 7.29: 269 nm average particle size (BI90 plus), a viscosity of 263 cPs (LV #2/60 rpms), 5 ppm MMA and 13 ppm BA.

TABLE 2-2

| ME2 | Wt (gm) | Initiator | Wt (gm) | Cofeed Initiator Solution | Wt (gm) |
|---|---|---|---|---|---|
| DI Water | 1684.4 | APS | 13.05 | APS | 20.39 |
| Dequest 2016 | 1.12 | DI WATER | 130 | tBHP | 0.66 |
| MOWIOL™ 4-88 solution (15% wt) | 1415.2 | | | DI water | 522 |
| sodium lauryl sulfate (SLS) | 53.3 | | | | |

| | Activator | | Cofeed Activator Solution | |
|---|---|---|---|---|
| butyl acrylate (BA) | 4457.1 | | | |
| MMA | 2926.6 | NaMBS | 9.39 | NaMBS | 30.84 |
| MMP | 3.90 | DI Water | 130 | DI Water | 654 |

RDP Synthesis Examples:

At ambient temperature, the emulsions indicated as in Table, below, were mixed with the indicated amounts of calcium hydroxide and water as in Table 4, below, to give neutralized emulsions having the indicated pH and solids content. The neutralized emulsions were then spray dried using a Niro Atomizer Spray Dryer (GEA Process Engineering Inc, Columbia, M.D.) laboratory spray dryer equipped with a nozzle (SU4 from Spray Systems Company, Wheaton, Ill.) to give the water redispersible polymer powders indicated in Table 5, below. Spray drying conditions, with tolerances for uncertainty were as shown in Table 3, below.

Unless otherwise specified, in all examples of aqueous dispersions in Table 4, below, an anti-caking agent of nepheline syenite (MINEX™ 7, Unimin Specialty Minerals Inc., New Canaan, Conn.) was included in the amount given in Table 7, below.

The resulting free-flowing powders were evaluated for % moisture, % ash content, and redispersibility by resistance to sedimentation and dispersion viscosity and the results were compiled in Table 5, below.

TABLE 3

| Temperature | | | | Anti-Caking |
|---|---|---|---|---|
| Inlet | Outlet | Air Flow | Latex | Aid |
| 170-180° C. | 62-64° C. | 6.0-6.2 kg/cm$^2$ | 55-65 gm/min | 2.9-3.5 gm/min |

TABLE 4

Aqueous Dispersions

| EXAMPLE RDP | Emulsion | Latex (gm) | Calcium Hydroxide (gm) | H$_2$O (gm) | pH | % Solids |
|---|---|---|---|---|---|---|
| *1 | A (no CaOH) | 1014.75 | 0 | 609 | 6.91 | 29.8% |
| 2 | A | 2098.78 | 12.92 | 750 | | 35.1% |
| 3 | A | 1008.31 | 7.76 | 359 | | 35.2% |
| 4 | A | 995.81 | 9.32 | 650 | | 28.9% |
| 5 | A | 1007.91 | 12.42 | 650 | | 29.0% |
| 6 | B | 972.67 | 6.28 | 650 | 11.19 | 28.9% |
| 7 | B | 999.45 | 7.54 | 650 | 12.35 | 28.6% |
| 8 | B | 1015.80 | 9.38 | 600 | 12.39 | 30.1% |
| 9 | B | 1009.40 | 10.90 | 600 | 12.43 | 30.1% |
| 10 | B | 1024.00 | 12.57 | 600 | 12.46 | 30.3% |
| 11 | B | 1007.40 | 13.95 | 600 | 12.46 | 30.2% |

*Denotes Comparative Example

% Moisture:

The RDP of each Example was measured using a Denver Instruments IR35 moisture balance (Denver Instrument, Bohemia, N.Y.) by placing 1 gm±0.2 gm of powder on the aluminum weigh pan provided and measuring the % water lost after 10 minutes at 105° C. % Moisture level is dependent on the spray drying conditions, but the preferred level is between 1.5-2.5%.

% Ash Content:

The RDP of each Example was measured using a TGA701 Thermogravimetric Analyzer (LECO Corporation, St. Joseph, Mich.). For each sample 3-5 g of powder was placed in a dry porcelain crucible and heat to 825° C. The % Ash content is the difference between the weight of the ash and the initial weight of the sample. For Minex 7, the ash content is ~99.5%. The preferred ash content is between 5-20%, and preferably between 10-14%.

Sedimentation & Dispersion Viscosity:

(The RDP of each Example was redispersed by mixing 50 gm equal weights of RDP and water for 30 minutes using a standard stainless steel agitator and an IKW RW 20 Digital Stirrer (Wilmington, N.C.) at 400 rpm. The viscosity of the resulting paste was measured using a Brookfield viscometer with a LV #4 spindle (Brookfield Engineering, Middleboro, Mass.) at 60 rpm. A higher the dispersion viscosity indicates increased redispersibility. The resulting paste was then let down with additional water, 1 part paste to 90 parts water. Sedimentation indicates the dispersion stability of the aqueous redispersed powder, where optimum sedimentation is 0 mm after 24 hours. Sedimentation analysis was conducted using a 0.5 mm diameter×45 cm in length burette modified with a flat base containing graduation in mm vs mL. Preferably, the level of sedimentation is ≤20 mm after 24 hours, preferably, ≤10 mm after 24 hours.

TABLE 5

RDP Evaluations

| RDP Example | Emulsion | % H2O | Ash Content | Sedimentation (mm 24 hr) | RDP Dispersion Viscosity (LV#4) |
|---|---|---|---|---|---|
| *1 | A | 1.36% | 13.33% | 38 | 500 cps |
| 2 | A | 1.60% | 12.84% | 20 | 3989 cps |
| 3 | A | 2.10% | 13.08% | 22 | 5500 cps |
| 4 | A | 2.10% | 9.06% | 18 | 6680 cps |
| 5 | A | 2.44% | 12.61% | 18 | |
| 6 | B | 2.11% | 13.92% | 17 | 6250 cps |
| 7 | B | 2.57% | 11.60% | 18 | 7648 cps |
| 8 | B | 2.15% | 8.85% | 13 | 8438 cps |
| 9 | B | 2.07% | 10.95% | 17 | 9358 cps |
| 10 | B | 2.36% | 11.97% | 20 | 7448 cps |
| 11 | B | 1.99% | 11.25% | 16 | 7848 cps |

*Denotes Comparative Example

A shown in Table 5, above, all of the inventive Examples 2 to 10 acceptable sedimentation or redispersibility, within reasonable limits of uncertainty; meanwhile the comparative Example 1 with no in process lime or (Ca(OH)$_2$) gave twice or nearly twice the sedimentation and was not redispersible within acceptable limits. Sedimentation performance improved in Examples 6 to 11 relative to the performance of Examples 2 to 5, at least in part because the amount of alkali soluble resin in Examples 6 to 11 is greater than in Examples 2 to 5, based on the total weight of the multi-stage acrylic copolymer.

Exterior Finishing Composition Examples

The performance of the textured paint compositions of the present invention were evaluated by comparing various formulations comprising the RDPs identified above.

70 PVC Dry EIFS Formulations:

In each test, a dry mix formulation was prepared comprising: 7.98 wt. % #15 sand; 64.83 wt. % 50-30 sand; 5.57 wt. % DURAMITE™ (CaCO$_3$ extender, Imerys Pigments North America, Inc., Roswell, Ga.); 0.60 wt. % METOLAT™ P 871 (neopentyl glycol-containing anti shrink coalescent, Munzing, DE); 0.12 wt. % WALOCEL™ 40000 PFV (cellulose ether thickener, The Dow Chemical Company, Midland, Mich.); 0.30 wt. % ATTAGEL 50™ (clay-containing rheology modifier, BASF, Leverkusen, Del.); 0.08 wt. % of #6 Denier MiniFibers (fiberglass) ~0.6 cm cut; 0.30 wt. % AGITAN™ P 804 (defoamer, Munzing, Germany); 4.49 wt. % TI-PURE™ R-960 (TiO$_2$ pigment, Dupont, Wilmington, Del.); 0.30 wt. % BIOBAN™ IBPC 100 (a biocide, Dow Chemical Company); 0.20 wt. % of potassium tripolyphosphate dispersant and 15.24 wt. % of each RDP identified in Table 5, above. The textured paint compositions were prepared by admixing the dry mix formulations with an additional 19.84%, based on the dry weight of the formulation, of water at the point of use.

77 PVC Dry EIFS Formulation:

In each test, a dry mix formulation was prepared comprising: 7.61 wt. % #15 sand; 61.87 wt. % 50-30 sand; 13.28 wt. % DURAMITE™ (CaCO$_3$ extender Imerys Pigments, Inc); 0.57 wt. % METOLAT™ P 871 (neopentyl glycol-containing anti shrink coalescent); 0.11 wt. % WALOCEL™ MKX 6000 PF (cellulose ether thickener); 0.29 wt. % ATTAGEL 50™ (clay-containing rheology modifier); 0.08 wt. % of #6 Denier MiniFibers (fiberglass) ~0.6 cm cut; 0.0.29 wt. % AGITAN™ P 804 (defoamer); 4.28 wt. % TI-PURE™ R-960 (TiO$_2$ pigment); 0.29 wt. % BIOBAN™ IBPC 100 (biocide); 0.19 wt. % of potassium tripolyphosphate dispersant and 11.15 wt. % of each RDP identified in Table 5, above. The textured paint compositions were prepared by admixing the dry mix formulations with an additional 15.64%, based on the dry weight of the formulation, of water at the point of use.

79 PVC Dry EIFS Formulation:

In each test, a dry mix formulation was prepared comprising: 7.52 wt. % #15 sand; 61.07 wt. % 50-30 sand; 15.36 wt. % DURAMITE™ (CaCO$_3$ extender); 0.56 wt. % METOLAT™ P 871 (neopentyl glycol-containing anti shrink coalescent); 0.11 wt. % WALOCEL™ 40000 PFV (cellulose ether thickener); 0.28 wt. % ATTAGEL 50™ (a clay-containing rheology modifier); 0.08 wt. % of #6 Denier MiniFibers (fiberglass) ~0.6 cm cut; 0.28 wt. % AGITAN™ P 804 (defoamer); 4.23 wt. % TI-PURE™ R-960 (TiO$_2$ pigment); 0.28 wt. % BIOBAN™ IBPC 100 (biocide); 0.19 wt. % of potassium tripolyphosphate dispersant and 10.04 wt. % of each RDP identified in Table 5, above. The textured paint compositions were prepared by admixing the dry mix formulations with an additional 18.69%, based on the dry weight of the formulation, of water at the point of use.

Early Rain Resistance Test:

To measure washout resistance of a coating after a specific curing time, temperature and relative humidity, specifically after exposure to a simulated moderate rain, this test also provides a relative indication of 24 and 48 hour film formation. Standard curing times are 24 and 48 hours of curing under standard and adverse conditions. More adverse conditions can be tested by reducing the cure time, lowering the cure temperature and increasing the relative humidity. The test measures washout resistance as a function of time and can be used to determine how fast a film will form under standard (room temperature and humidity) and adverse (low temperature, high humidity) curing conditions. Each of the textured and pigmented finishing compositions described above were applied with a trowel to a wet thickness of 1.6 mm onto a 2.56 cm (1") expanded polystyrene (EPS) board coated with a cementitious EIFS basecoat, with mesh embedded. Samples were placed into an environmental chamber (or CTR) immediately after the last sample is trowelled down. Each coated board was set in the environmental chamber or CTR for the indicated time, and was then removed and placed into a water spray using a rectangular 5.12 cm×12.8 cm standard garden hose nozzle connected to building supplied tap water. The water is sprayed at a rate of 11.36 L/min across the face of the test panel, with the nozzle kept as close to a ~90° angle to the finished surface as possible. A timer was used to measure the spray time to surface erosion, blister, or erosion through to the substrate for each of the examples tested. The maximum water spray exposure time was 2 hours, after which each coated EPS board was removed from the water spray and the time for each treated EPS board to blister or washout was reported.

Wet Abrasion (or Scrub) Resistance Test Procedure:

Measures the resistance of an exterior finishing composition to abrasion and provides a measure of early film formation. The textured and pigmented finishing compositions described above were applied with a trowel to a wet thickness of 1.6 mm onto a 16.5 cm×43.2 cm vinyl sheet. Each coated sheet was dried either at 75° F. and a relative humidity of 50% for 24 hours or at 40° F. and a relative humidity of 70% for a period of 48 hours, a indicated, after which, uncoated vinyl from the edges of the sample are trimmed. The initial weight of the coated sheet (A) was recorded to the nearest 0.01 gram and then each coated sheet was taped onto an aluminum plate with the coated side up and placed on an abrasion tester (Gardener Straight Line Tester, Gardener Labs, Columbia, Md.). In the abrasion tester, 10 g of an abrasive scrub medium made in conformance to ASTM Method D2486-06 (Published 2012) and D3450-00 (Published 2010) (SC-2, the Leneta Company (Mahwah, N.J.)) and 10 g of water was evenly applied onto a brush mounted onto the abrasion tester with the bristles touching the coated sheet. The abrasion tester was started and 2000 cycles were completed, with 10 g SC-2 and 10 g water being re-applied to the brush after completion of every 500 cycles. The coated sheet was removed from the tester, rinsed under warm water, and then dried for at least 12 hours at 25° C. and 50% relative humidity. After drying, the final weight of each coated sheet (B) was determined to the nearest 0.01 gram. Finally, each uncoated vinyl sheet was cut into three test strips with identical dimensions as the coated sheet and weighed to the nearest 0.01 gram; the weight of the uncoated vinyl sheet (C) was taken as the average of these three weights. The % weight loss of each coated sheet was determined according the following equation, with the recorded result representing the average of at least two tested samples:

$$\% \text{ Weight Loss} = 100 \times \frac{A-B}{A-C}$$

A low value of % weight loss indicates good initial film formation and resistance to abrasion. Acceptable % weight loss is 5%, preferably, 4%.

The data from the Early washout testing are presented in Tables 6a and 6B, below.

TABLE 6A

Early Washout Data (Baseline Comparison)

| Example | Low Temp (40° F./70% RH) Dry | | | | | Room Temp (75° F./50% RH) Dry | | | |
|---|---|---|---|---|---|---|---|---|---|
| | 24 Hr | 16 Hr | 12 Hr | 8 Hr | 6 Hr | 16 Hr | 6 Hr | 4.5 Hr | 3 Hr |
| 70 PVC | | | | | | | | | |
| 2 | Pass | Pass | Pass^ | Fail 20' | Fail 9' | Pass | Pass | Pass | Fail 30' |
| *13[1] | Fail 45' | Fail 6' | Fail 8' | Fail 5' | Fail 1' | Pass | Fail 75' | Fail 30' | — |
| *14[2] | Pass^ | Fail 90' | Fail 10' | Fail 6' | Fail 2' | Pass | Fail 25' | Fail 10' | — |
| *15[3] | Pass | Pass | Fail 15' | Fail 3' | Fail 3' | Pass | Pass | Fail 75' | — |
| 79 PVC | | | | | | | | | |
| 2 | Pass | — | Pass | Fail 15' | — | — | Pass | Pass | Fail 30' |
| *13[1] | Pass^ | — | Fail 10' | Fail 4' | — | — | Fail 60' | Fail 60' | — |
| *14[2] | Pass^ | — | Fail 4' | Fail 2' | — | — | Pass | Fail 10' | — |
| *15[3] | Pass | — | Fail 12' | Fail 5' | — | — | Pass | Fail 70' | — |

^Aggregate was observed;
*Denotes Comparative Example;
[1]Acrylic RDP-multi-stage acrylic copolymer with 20 wt. % ASR, Tg (DSC) 14.0° C., 3.98 wt. % copolymerized MAA, [Ca(OH)₂]1.38 wt. %; Wt. % Lime: MAA 0.3467; mol ratio CaOH₂:MAA 0.403;
[2]Elotex WR8600 acrylic RDP from Akzo Nobel Chemicals AG, Switzerland, polymer Tg (DSC) -2° C.;
[3]RHOPLEX™ EI 2000 acrylic copolymer emulsion (Dow).

TABLE 6B

Early Washout - Influence of Lime Concentration

| Example | Description (wt. ratio Ca(OH)₂:MAA) | 12 hr Dry | 5 Hr Dry | 4 H Dry | 3 Hr Dry |
|---|---|---|---|---|---|
| *12[1] | Emulsion A, None | | | Fail 15' | Fail 5' |
| 6 | Emulsion B, 0.429 | Pass 120' | Pass 120' | Fail 45' | Fail 10' |
| 7 | Emulsion B, 0.535 | Pass 120' | Pass 120' | Fail 60' | Fail 15' |
| 8 | Emulsion B, 0.638 | | | Pass 120' | Fail 30' |
| 10 | Emulsion B, 0.846 | | | Pass 120' | Fail 45' |
| 2 | Emulsion A, 0.522 | Fail 75' | | Fail 45' | |
| 3 | Emulsion A, 0.651 | | | Pass 120' | |

Conditions: 77 PVC, Cure (dry) @ 22° C. (72° F.), 50% relative humidity (RH).
*Denotes Comparative Example;
[1]RHOPLEX™ EI 2000 acrylic polymer emulsion As shown in Tables 6A and 6B, above, the early washout performance of the inventive examples having the multi-stage acrylic copolymer and the calcium salt of ASR in the claimed proportions well outperformed the comparative acrylic polymer RDPs and even outperformed the RDP of example 12 which had an alkali soluble resin in a multi-stage acrylic copolymer and used significantly less aqueous lime.

Table 7A compares known alternative technical approaches to achieve early rain resistance. The data show that the composition of the present invention offers at least equal performance to the benchmark in the industry that uses polyamine "Quickset" technology, but without the high ammonia level required to stabilize the polyamine chemistry.

TABLE 7A

Early Rain Resistance vs Current Technology

| RDP Example | Description | 3 Hr Dry |
|---|---|---|
| *16[1] | Latex Control | Fail 15' |
| 2 | RDP | Fail 50' |
| *17[2] | Latex; Polyamine (Quickset) | Fail 50' |
| *18[3] | Latex; Polyamine (Quickset) | Fail 45' |

Conditions: 77 PVC, 72° F. (22° C.), 50% relative humidity (RH).
*Denotes Comparative Example;
[1]RHOPLEX ™ EI 2000 acrylic latex (Dow);
[2]Rhoplex ™ EI 3500 acrylic latex (Dow);
[3]Primal ™ FS3600 acrylic latex (dow).

As shown in Table 7, below, the inventive compositions benefitted from addition of more lime to the aqueous dispersion prior to spray drying. The compositions in Examples 3 to 5 and 8 to 11 significantly outperformed the currently available acrylic RDP.

TABLE 7

Abrasion Resistance and Lime Concentration (all %s are wt. % s, based on total solids in the spray dryer)

| Example | Emulsion | ASR | ACA | Wt % Ca(OH)$_2$:MAA | % Weight loss (Average) |
|---|---|---|---|---|---|
| *12[1] | Latex Control | | | | 3.56 |
| 2 | A | 10% | 12.04% | 0.522 | 3.63 |
| 3 | A +25% more Ca(OH)$_2$ | 10% | 13.08% | 0.651 | 2.90 |
| 4 | A +50% more Ca(OH)$_2$ | 10% | 9.06% | 0.775 | 2.37 |
| 5 | A; +100% more Ca(OH)$_2$ | 10% | 12.61% | 1.029 | 2.26 |
| 6 | B | 12.5% | 14.04% | 0.429 | 4.25 |
| 7 | B +25% Ca(OH)$_2$ | 12.5% | 11.60% | 0.535 | 3.38 |
| 8 | B; +50% Ca(OH)$_2$ | 12.5% | 8.85% | 0.638 | 2.84 |
| 9 | B +75% Ca(OH)$_2$ | 12.5% | 10.95% | 0.744 | 2.83 |
| 10 | B +100% Ca(OH)$_2$ | 12.5% | 11.97% | 0.846 | 3.01 |
| 11 | B +125% Ca(OH)$_2$ | 12.5% | 11.25% | 0.953 | 3.20 |

Conditions: 77 PVC; 40° C.; 48 hrs; 70% RH
*Denotes Comparative Example;
[1]RHOPLEX ™ EI 2000 acrylic polymer (Latex Control)

We claim:

1. A shelf-stable, non-cementitious dry mix composition comprising i) one or more extenders, pigments, fillers, or their mixtures, in a total % PVC of from 60-98%, and ii) from 10-20 wt. %, based on the total weight of the composition solids, of a water redispersible polymer powder (RDP) containing particles of a multi-stage acrylic copolymer having a calcium methacrylate salt group-containing alkali-soluble resin outer stage and one or more inner stage, the particles further containing each of one or more nucleating agent having a boiling point of 150° C. to 500° C. and a water solubility of 3.5% or less, and one or more colloidal stabilizer, wherein when the multi-stage acrylic copolymer is dispersed in water the one or more inner stage comprises an acrylic (co)polymer having a glass transition temperature (Tg) of from −40 to 50° C., calculated using the Fox equation, and wherein the weight ratio of the alkali-soluble resin outer stage to the one or more inner stage(s) range from 1:19 to 2:3, wherein the colloidal stabilizer and the multi-stage acrylic copolymer are contained in the same RDP particle, the composition has less than 5 wt. % of calcium silicate containing materials which react with water and harden to produce a water insoluble material, based on the total weight of the dry mix composition and, the RDP comprises calcium cation in a mole ratio of calcium cation ($Ca^{2+}$) to moles of methacrylic acid of from 0.94:1 to 1.06:1.

2. The composition as claimed in claim 1, wherein when the multi-stage acrylic copolymer is dispersed in water the one or more inner stage comprises an acrylic (co)polymer having a glass transition temperature (Tg) of from −20 to +25° C.

3. The composition as claimed in claim 1, wherein the dry mix comprises one or more filler which is silicon dioxide, sand or aggregate.

4. The corn position as claimed in claim 1, wherein the ii) water redispersible polymer powder contains from 0.1 to 20 wt. % of the one or more colloidal stabilizer, per 100 weight parts multi-stage acrylic copolymer solids.

5. The composition as claimed in claim 1, wherein the colloidal stabilizer is polyvinyl alcohol.

6. The composition as claimed in claim 1, wherein the composition comprises i) one or more fillers, extenders and pigments which are a) from 40 to 80 wt. % of silicon dioxide, aggregate, sand or their mixtures, b) from 0 to 10 wt. % of one or more extenders, c) 0-10 wt. % pigment, based on the total weight of composition solids.

7. A non-cementitious exterior finishing composition comprising the dry mix composition as claimed in claim 6 and water.

* * * * *